United States Patent [15] 3,645,626
Druschel [45] Feb. 29, 1972

[54] APPARATUS FOR DETECTING DEFECTS BY OPTICAL SCANNING

[72] Inventor: William O. Druschel, Granite Springs, N.Y.
[73] Assignee: International Business Machines Corporation, Armonk, N.Y.
[22] Filed: June 15, 1970
[21] Appl. No.: 46,093

[52] U.S. Cl. ................ 356/71, 235/61.11 E, 340/149, 356/167, 356/206, 356/212
[51] Int. Cl. ..................................................... G06k 9/08
[58] Field of Search .............. 356/167, 168, 71, 206, 212; 250/219, 219 QA; 235/61.11 E, 61.11 R, 61.7; 340/149 A, 149

[56] References Cited

UNITED STATES PATENTS 2,679,636  5/1954  Hillyer .................................. 340/149

FOREIGN PATENTS OR APPLICATIONS 834,125  11/1957  Great Britain ...................... 356/167

Primary Examiner—Ronald L. Wibert
Assistant Examiner—J. Rothberg
Attorney—Hanifin and Jancin and Julius B. Kraft

[57] ABSTRACT

Apparatus for detecting defects in optically discernible patterns on substrates. In apparatus which compares the optically discernible patterns in a pair of regions by coincidentally scanning said regions with a pair of optical sensing members in order to detect differences in the coincidentally sensed data, there is provided a control pattern and a third optical sensing means for scanning the control pattern along a path coincident with the scan paths of the first two sensing means. The control pattern contains optical indicia. When the third sensing means senses one of these optical indicia it activates means which interrupts the comparison of the data sensed by the pair of sensing means.

25 Claims, 6 Drawing Figures

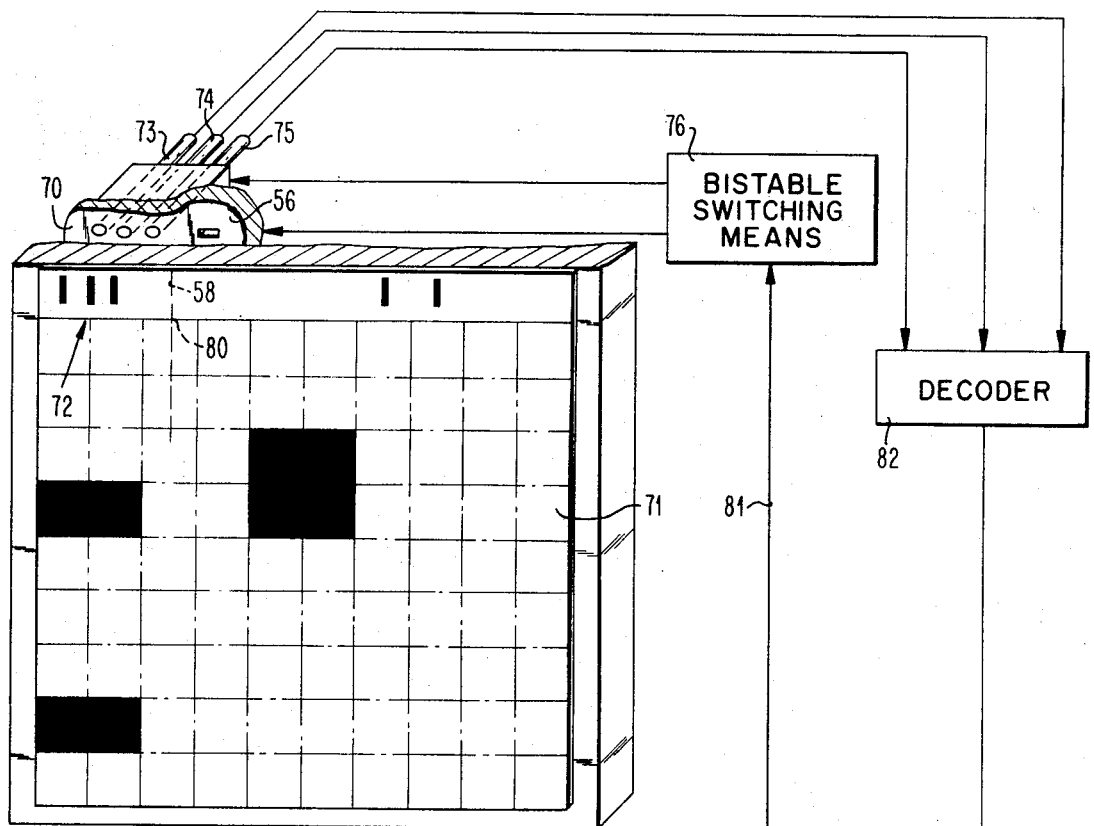
FIG. 4
FIG. 5
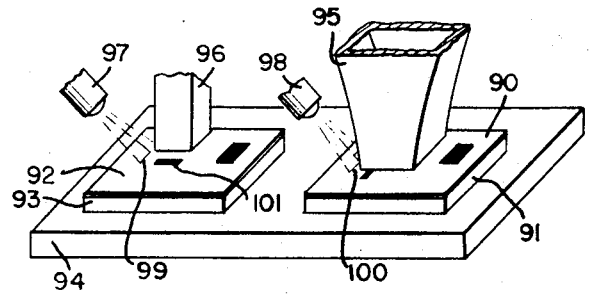

APPARATUS FOR DETECTING DEFECTS BY OPTICAL SCANNING

BACKGROUND OF THE INVENTION

1. Field of the Invention

The present invention relates to apparatus for determining optically discernible defects in surfaces and more particularly to apparatus for determining such defects by comparing an optically discernible pattern in one region of a particular surface to an optically discernible pattern in another region.

2. Description of the Prior Art

In many areas of technology, it is at times necessary to examine substrates in order to detect optically discernible defects or incongruities. Such defects are customarily detected by scanning the substrate with optical sensing means. After, the existence of defects is determined by a comparison of the substrate being inspected with a reference substrate which is being coincidentally scanned by optical sensing means. The reference substrate may be one known to have an acceptable optically discernible pattern. Thus, any differences in the optically discernible pattern in the substrate under inspection from that of the reference would be considered to be a defect. Alternatively, where regions in a substrate have optically discernible patterns which are repetitive in the same substrates or a different substrate, a pair of such repetitive patterns may be compared to each other by simultaneous coincident scanning with sensing means. Any failures to compare would be indicative of a defect in either of the pair of patterns being compared.

Comparison apparatus for comparing a pair of repetitive patterns in different regions on the same substrate has significant application in the field in microminiature semiconductor device and integrated circuit manufacturing. The semiconductor devices or circuits are formed on a wafer of semiconductor material consisting of hundreds of repeatable units which will be subsequently diced into chips. Comparison apparatus has usage in the comparison of the repeatable units on the wafer to each other. However, more significantly comparison apparatus has been used to compare the repeatable units in the masks used in the various stages of semiconductor device fabrication. These masks are used in the exposure of photoresist patterns which in turn determine the pattern of impurity diffusion, metallurgy applied or insulative material applied during a particular semiconductor fabrication step. Such masks are customarily formed by the exposure of photographic emulsion plates to a repetitive image to produce a repetitive pattern in the mask where each repetitive unit in the mask corresponds to the pattern to be formed in each chip on the wafer.

In the use of apparatus for the comparison of repetitive patterns in a mask a pair of optical sensing elements scan corresponding repetitive units in the mask synchronously in the translational (X,Y) direction. A failure to compare is indicative of a defect in one of the pair of patterns being scanned. Because of the minute proportions of elements in the microminiature mask, the required level of comparison of the sensed optical data must be sufficiently high that even minor distinction in the sensed data will produce a signal indicative of a failure to compare.

This required high level of comparison permits only very low levels of tolerance before a defect signal is generated. However, there are many areas on the mask where much greater tolerances are permissible and exist. For example, the regions in the mask corresponding to the kerf region on the wafer, i.e., the region separating the chips, have relatively broad pattern tolerances. Also, there are portions in mask which do not contain repeatable patterns. For example, most wafers and masks used to fabricate such wafers contain fiducials which are optically or visually discernible reference marks used in the alignment and positioning of the wafer or the mask. Consequently, in order to avoid the comparison apparatus from generating erroneous defect signals, means must be provided for interrupting the comparison when scan paths of at least one of the pair of synchronously moving sensing elements traverses a region likely to provide such an erroneous defect signal.

One approach which has been tried in the solution of this problem has been to provide control means for controlling the pair of scanning sensing elements which controls have predetermined scheduled interrupts of the comparison at known points in the X,Y scan paths where the optical pattern may produce erroneous defect signals. This requires a rather complex computer control of the scan paths using computer program predetermined comparison interrupts specified by X,Y coordinates along the scan paths. This approach has been found to be quite expensive as it makes relatively significant demands on computer CPU (Central Processing Unit) time.

SUMMARY OF THE INVENTION

Accordingly, it is a primary object of the present invention to provide apparatus for optically detecting pattern defects by comparison of a pair of patterns wherein interrupts in comparison may be efficiently and inexpensively achieved.

It is another object of the present invention to provide apparatus for the comparison of optical patterns which apparatus may be subjected to a predetermined pattern of scheduled interrupts in the comparison.

It is a further object of the present invention to provide apparatus for detecting defects in optically discernible patterns in masks used for semiconductor device and circuit fabrication.

It is yet another object of the present invention to provide apparatus for detecting defects in optically discernible patterns which patterns are repeated on a particular substrate.

It is an even further object of the present invention to provide apparatus for detecting defects in optically discernible patterns on substrates through the comparison of a pair of said patterns in which predetermined interrupts in comparison may be scheduled without the use of a programmed computer.

In accordance with the present invention, there is provided a method and apparatus for the comparison of an optically discernible pattern in a first region with an optically discernible pattern in a second region by first and second optical sensing means for respectively scanning said first and second patterns coincidentally with each other, and means for comparing the data sensed by both sensing means. The apparatus provides for a control system for interrupting the comparison at predetermined points along the coincident scan paths of said first and second sensing means. The control system includes an optical control pattern containing at least one optical indication for effecting such an interruption in said comparison and a third optical sensing means for scanning the control pattern and means responsive to said third optical sensing means for interrupting the comparison upon sensing of an interrupt indication by said third sensing means.

Said first and second sensing means preferably respectively scan the first and second optically discernible patterns synchronously along first and second identical paths. The third optical sensing means scans the control pattern coincidentally with the scanning of said first two patterns along a path identical with said first two paths.

The foregoing and other objects, features and advantages of the invention will be apparent from the following more particular description and preferred embodiments of the invention as illustrated in the accompanying drawings.

BRIEF DESCRIPTION OF THE DRAWINGS

FIG. 1A is a fragmentary sectional view taken along line 1A—1A of FIG. 1 and further includes the circuitry for carrying out the comparison and the interrupt of the comparison shown in block diagram form.

FIG. 4 is a diagrammatic fragmentary perspective view of an additional embodiment of the present invention and further includes the circuitry, for carrying out the embodiment, shown in block diagram form.

FIG. 5 is a fragmentary, perspective, schematic view of another embodiment of the present invention in which reflected light is utilized to detect irregularities in the patterns.

With reference to FIGS. 1 and 1A, mask 10 having a plurality of repeatable units which are to be compared to each other is mounted on holder 11 and control mask 12 is mounted on holder 13. The holders are affixed to X table 14 which in turn is seated on Y table 15 to provide an XY table structure. The mask being inspected is a standard mask used in the fabrication of integrated circuits. It is more clearly illustrated with reference to FIG. 2. It comprises a transparent substrate 30 carrying a transparent coating in which opaque regions 31 form a pattern; the pattern is a repeatable pattern with each of mask units 32 containing identical pattern. Control mask 12, as shown in detail in FIG. 2, comprises transparent substrate 33 which has the same dimensions as transparent substrate 30. Opaque indications 34 are disposed in control mask 12 in positions corresponding to units 32 in mask 10 which are not to be subject to a comparison by the present apparatus.

Figure 1:
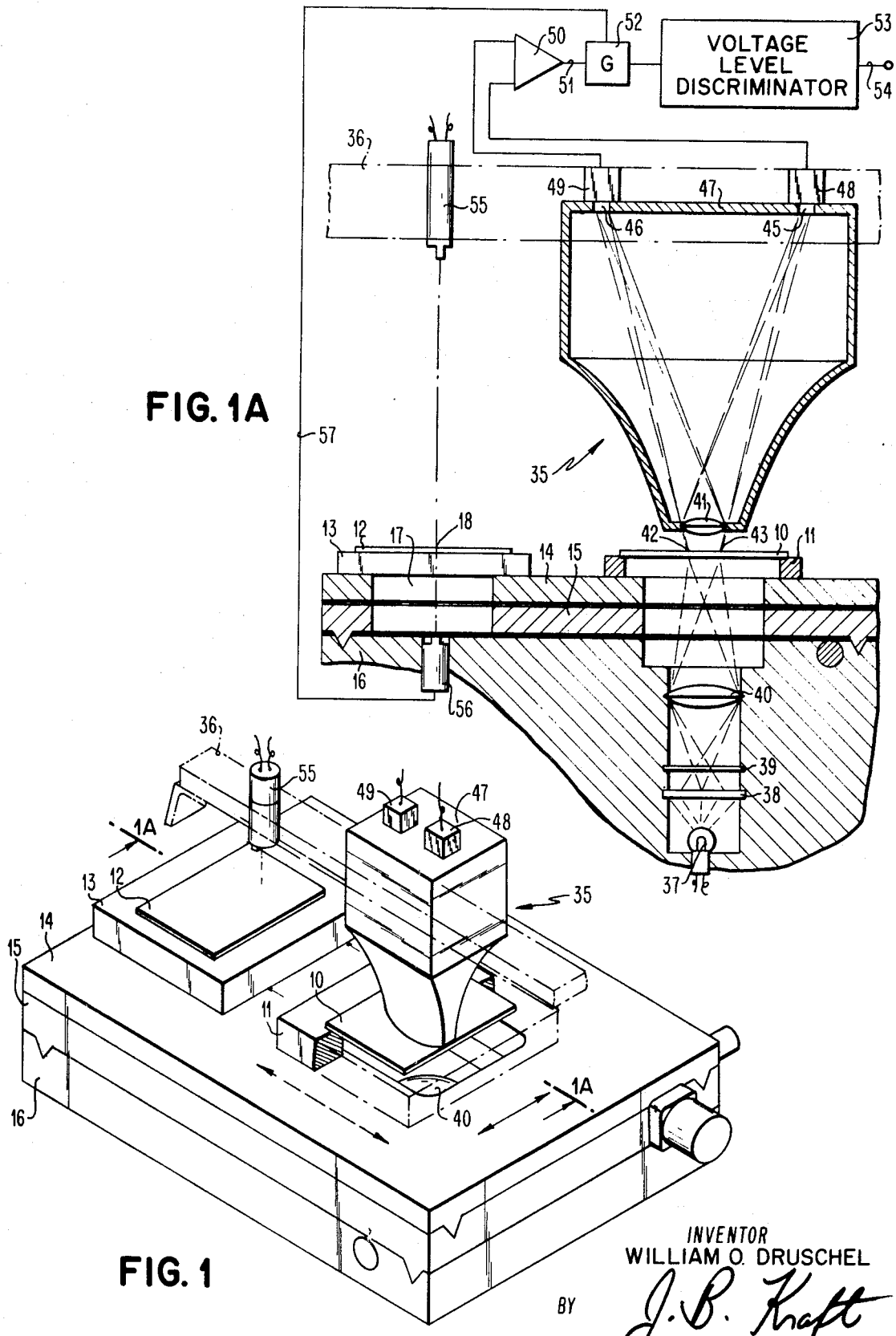
FIG. 1 is a fragmentary perspective view of apparatus for the preferred embodiment of the present invention.

Returning now to FIGS. 1 and 1A, the repetitive patterns in mask 10 are sensed by a pair of sensing members contained in sensing head 35 which is affixed to supporting brace 36 at a position above mask 10. Mask 10 is illuminated from below by an illuminating system consisting of light source 37, diffusing screen 38, limiting aperture plate 39 and condenser lens 40. Projection lens 41 supported in sensing head 35 focuses the light transmitted through portions 42 and 43 of mask 10 respectively through slits 45 and 46 formed in aperture plate 47 to photocells 48 and 49. Photocells 48 and 49 respectively detect the amount of light transmitted through slits 45 and 46 and consequently, the light transmitted from portions 43 and 42 on the mask surface. The output signals from photocells 48 and 49, which are indicative of the amount of light sensed by each of said cells, are applied to differential amplifier circuit 50 which provides a voltage level output 51 indicative of a difference between the two applied signals. This output is applied through gate 52, the function of which will be described hereinafter, to voltage level discriminator 53 which determines whether the difference signal from different amplifier circuit 50 is at a level sufficient to indicate a defect in mask 10. Upon the detection of a voltage level indicative of a defect, an output signal indicative of a defect will appear at output 54.

The means for sensing control pattern mask 12 simultaneously with the sensing of mask 10 is accomplished by the combination of collimated light source 55 and photocell 56. Photocell 56 is mounted in a fixed position within table support 16 and does not move when the XY table combination 14 and 15 is moved. The light from light source 55 passes through mask 12 and through opening 17 in holder 13 and the XY table to photocell 56.

Since photocell sensing means 56 is in a fixed position with respect to photocell sensing means 48 and 49, the motion of the XY table, which will be described in greater detail hereinafter, will provide a translational scan path for photocell sensing means 56 substantially identical to the scan paths provided for photocell sensing means 48 and 49. Then, when mask portions 42 and 43 are being sensed, if portion 18 of the control pattern, which is being simultaneously sensed, is transparent, photocell 56 will sense the collimated light from light source 55 and will provide a gating signal on line 57 to gate 52 which will permit the passage of a comparison voltage signal from differential amplifier 50 to voltage level discriminator 53. However, if portion 18 is an opaque region, e.g., indicator 34 on the control mask in FIG. 2, then no gating will be applied from photocell 56 to gate 52 and the comparative voltage signal from differential amplifier 50 will not be applied to voltage level discriminator 53. In this manner, the position and nature of the opaque pattern indications on the control mask can either permit or interrupt the comparison of the information sensed from the mask under inspection 10.

Figure 2:
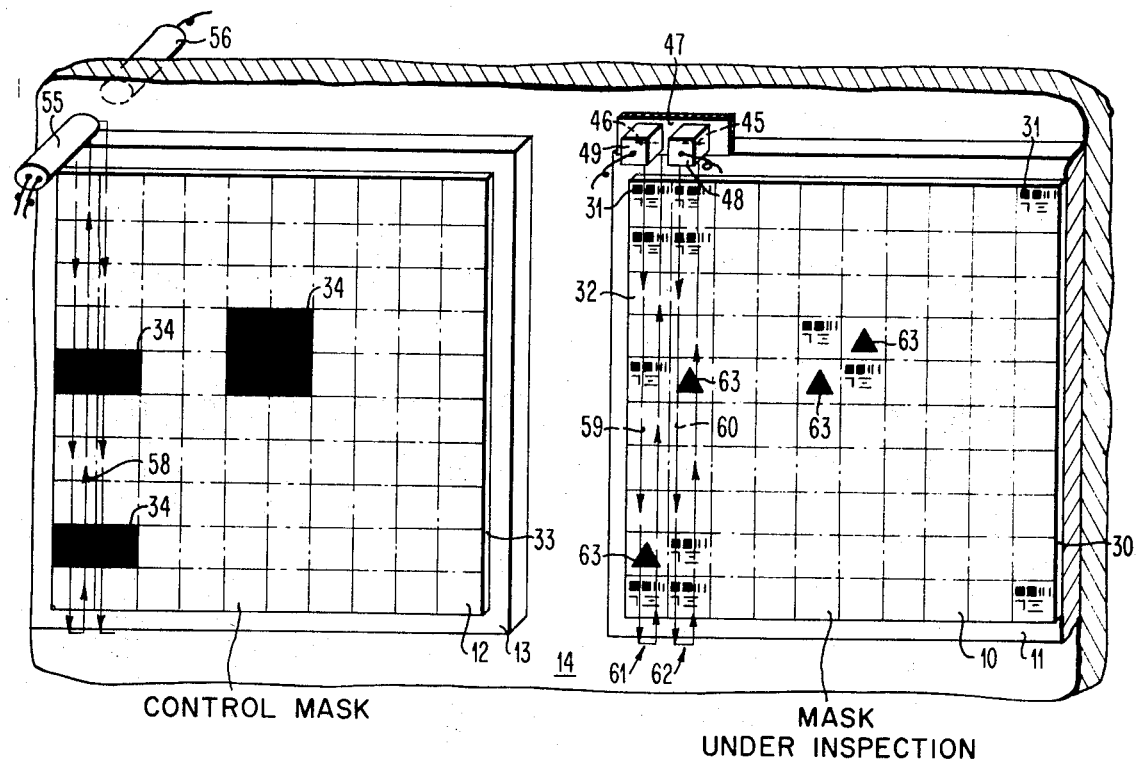
FIG. 2 is a diagrammatic fragmentary perspective view to illustrate the coincidence scan paths of the first, second and third sensing means with respect to the first and second patterns being compared and the control pattern.

Sensing means 48, 49 and 56 respectively scan first and second repeatable patterns in the mask being inspected and the control pattern in the control mask coincidentally in identical paths provided in the following manner. With reference to FIGS. 1 and 2, sensing means 48, 49 and 56 are in a fixed positional relationship to each other. Y-table 15 is then moved down along the Y-axis to provide identical scan paths 58, 59, 60, as shown in FIG. 2. Thus, sensing means 49 scan column 61 of mask 10 along scan path 59 simultaneously with the scanning of the repeatable pattern in column 62 of mask 10 by sensing means 48 along path 60 which is substantially identical with path 59. The repeatable pattern in column 61 is thereby compared with the repeatable pattern in column 62. Simultaneously, with this scanning by sensing means 48 and 49, sensing means 56 scans the control mask 12 along identical path 58. When the scan paths reach the lower end of their respective columns, X table 14 is indexed to the right along the X-axis after which Y table 15 is moved upward, along the Y-axis to produce the upward-going legs of scan paths 58, 59 and 60. Then, when the top of mask 10 is reached, X table 14 is again indexed to the right and Y table 15 is moved in the downward direction to produce the downward leg of scan paths 58, 59 and 60 as shown in FIG. 2.

Figure 3:
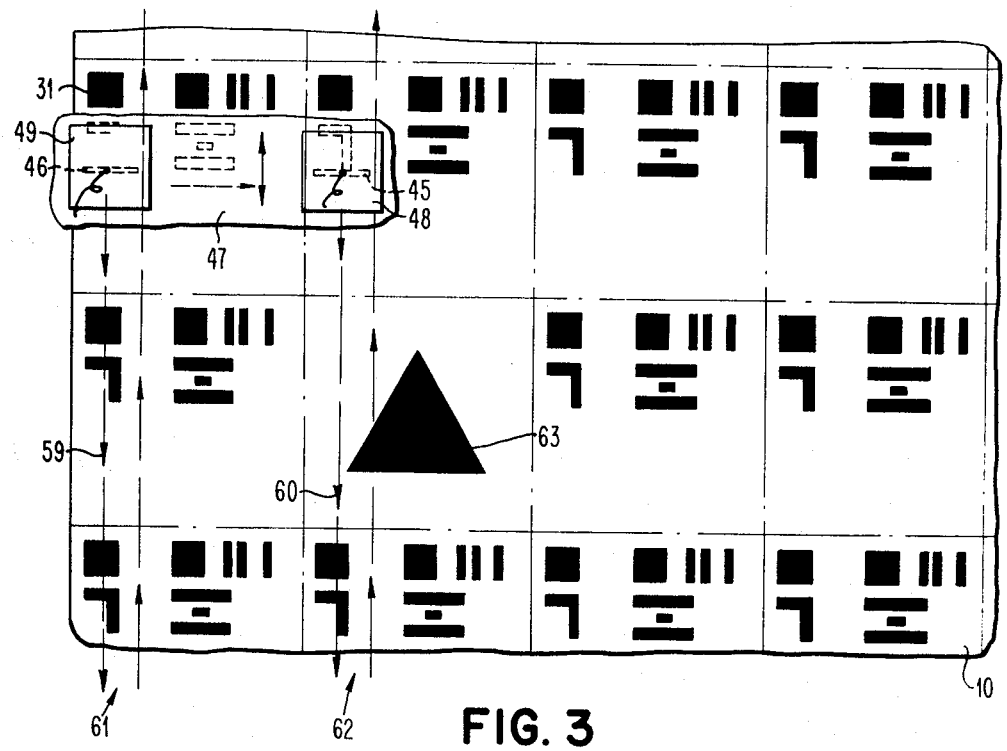
FIG. 3 is an enlarged diagrammatic fragmentary plan view of the apparatus illustrating the scan paths of said first and second sensing means across said first and second patterns to be compared.

With reference to FIGS. 2 and 3, the patterns being compared on mask 10 by sensing means 48 and 49 along paths 59 and 60 are repeatable patterns which should be identical to each other. The comparison reveals whether or not the patterns are identical. If the patterns fail to compare, this is indicative of a defect in the portion of the mask being compared. However, mask 10 has several fiducials 63 which are used for mask alignment. When a scan path crosses such a fiducial, there will be a failure to compare and defect signal will result. Indications 34 are positioned on control mask 12 so as to prevent a comparison and the consequent failure to compare signal when either scan paths 59 or 60 crosses a fiducial 63. When scan path 60 of sensing means 48 crosses the fiducial in column 62, scan path 58 of sensing means 56 coincidentally crosses an opaque indication 34. This opaque indication cuts off the gating signal from gate 52 in FIG. 1A, thereby preventing a voltage level indicative of a failure to compare from being applied to voltage discriminator 53. Thus, no failure to compare signal results on output 54. It should be noted with respect to FIG. 2 that indicators 34 are so positioned that, when either of the scan paths 59 or 60 of sensing means 48 and 49 cross a fiducial, scan path 58 of sensing means 56 is coincidentally crossing an opaque indicator 34. Accordingly, a comparison is prevented.

While the means for moving X table 14 and Y table 15 have not been shown, it will be understood that any conventional means for moving these tables may be used, including shafts for applying linear forces respectively to the X and Y tables. These shafts may be driven by any standard motors, e.g., stepping motors.

The failure to compare signal on output 54 when given, may be indicated to the operator of the machine in any conventional manner, such as on a visual display, and/or it may be applied to a counter which counts the number of defects in the mask. It may also be stored in appropriate data storage means together with the coordinates of the XY table at the point the defect occurs. Also, when a defect signal is given on display means, the conventional display means may include an indication of the X and Y coordinates of the table.

Additionally, it should be recognized that as long as the surface of the structural pattern or the patterns to be compared is capable of light reflection, the pattern formation may be sensed by reflecting light from the surface of either the control pattern and/or the patterns to be compared. For example, and as illustrated in FIG. 5, a mask 90 having a plurality of repeatable units which are to be compared to each other is mounted on a holder 91 while a control mask 92 is mounted on a holder 93, the holders being attached to an XY stage or table 94 such as heretofore described. The mask 90 may be a standard mask such as the mask heretofore described with repeatable patterns thereon which are to be compared by way of a sensing head 95 (containing sensing members heretofore described). Similarly the control pattern mask 92 includes a light sensing head such as a photocell 96 which is positioned adjacent to the control pattern 92. Instead of the light sources, for example the light sources 55 and 47 heretofore described relative to FIGS. 1–3, being positioned on the opposite side of mask 90 and 92, the light sources may be positioned, as illustrated in FIG. 5, as at 97 and 98, and at such an angle to permit reflected light 99 and 100 to enter the sensing heads 96 and 95 respectively. The remainder of the structure is similar to that described with reference to FIGS. 1–3. In this manner when, for example, the control pattern mask 92 registers with the sensing head 96 at a point where an opaque region 101 appears on the mask, the mask will exhibit reflectivity different from that of the remainder of the pattern. In all respects, except with regard to the use of the reflected light the patterns may be identical to that heretofore described relative to FIG. 2.

While in the preferred embodiment of the present invention, the scan paths of the comparing sensing means and the control sensing means have been shown to be identical. These respective paths need not be identical with each other, e.g., one or more of the three patterns may differ in scale with each other, in which case their respective scan patterns may correspondingly differ in scale with each other.

In accordance with another embodiment of the present invention as shown in FIG. 4, the apparatus includes means for rapidly positioning the comparing sensing means at selected positions with respect to the patterns to be compared and for positioning the control sensing means at a corresponding position with respect the the control pattern. Such means have value where only limited portions of patterns are to be compared. In such cases, it avoids the necessity of having the comparing sensing means and the control sensing means to traverse their respective entire scanning paths. The apparatus moves the respective sensing means directly to the positions where the comparison sensing is to begin.

Sensing means 70, which may be attached to sensing means 56, as shown in FIG. 4, scans control mask 71 in the translational (X,Y) direction simultaneously with the scanning of control mask 71 by sensing means 56. This is accomplished in the means previously described with respect to FIG. 2 by the movement of the X, Y tables 14 and 15 on which the control mask is mounted. The control mask 71 differs from control mask 12 of FIG. 2 in that the initial portion across the top of the mask contains groups of optically discernible coded data marks 72. Each group comprises three data mark positions corresponding to three photocells 73, 74 and 75 in sensing means 70. During the initial portion of the downward leg of scan path 58 traversed by sensing means 56, sensing means 70 will traverse and sense a data mark group 72.

During the scanning of a data mark group 72 by sensing means 70, sensing means 56 is preferably interrupted. As a result of this interruption, no gating signal is passed along line 57, FIG. 1A to gate 52, and thus no comparison is made by the comparative sensing means. It should be noted, at this point, that although no mask under inspection by comparing sensing means is shown in FIG. 4, the control mask and sensing means 56 and 70 and is used to control comparison sensing apparatus substantially identical with those shown in FIGS. 1A and 2.

Bistable switching means 76 are provided for turning sensing means 70 on during the initial portion of a downward scanning leg and for turning sensing means 56 off during the same. Since the downward leg 58 of the scan path is determined by X, Y motors 77 and 78, motor controller 79, which keeps track of the position of the X, Y tables, sends a first signal to bistable switching means 76 along line 81 during the commencement of a downward leg, and sensing means 70 is switched on and sensing means 56 off. The remainder of the downward leg of scan path 58 may be continued by sensing means 56 in the manner previously described with respect to the apparatus of FIG 2.

Getting back to the scanning by sensing means 70 of a data mark group 72 during the initial portion of a downward leg, the combination of a data mark or no data mark in each of the three positions of the data mark group will result in data sensed by photocells 73, 74 and 75 of sensing means 70 in the form of a three-bit binary data code. If we consider the presence or the absence of a data mark as a one (1) or a zero (0), data group being sensed in FIG. 4 may be considered as 1 0 1. With a group of three data marks, there are eight different combinations of zero's and one's and, thus, each data group may represent eight possible positions to which X, Y-tables 14 and 15 may be shifted to correspondingly shift the scanning positions of control sensing means 56 and the pair of comparing sensing means 48 and 49.

The data sensed by sensing means 70 is transmitted to decoder 82 which translates the data into signals discernible by motor controller 79, which inturn causes each of X and Y motors 77 and 78 to respectively step a distance sufficient to move the X, Y tables to the desired new position. Of course, one combination of data marks in a group 72 will represent no change in position, thereby leaving seven possible combinations of data marks to indicate new positions to which the sensing means are to be shifted with respect to the patterns.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for comparison of an optical pattern in a first region with an optical pattern in a second region comprising:
   first optical sensing means for scanning said first pattern,
   second optical sensing means for scanning said second pattern coincidentally with the scanning of the first pattern,
   means for comparing the data sensed by the first sensing means with that sensed by the second sensing means,
   a control optical pattern,
   third optical sensing means for scanning said control pattern coincidentally with the scanning of said first and second patterns, said control pattern containing at least one optical indication for effecting an interruption in said comparison, and
   means responsive to said third optical sensing means for interrupting said comparison upon sensing of an interrupt indication by said third sensing means.

2. Apparatus for comparison of an optical pattern in a first region with an optical pattern in a second region comprising:
   first optical sensing means for scanning said first pattern along a first path,
   second optical sensing means for scanning said second pattern along a second path identical with said first path,
   means for comparing the data sensed by the first sensing means with that sensed by the second sensing means,
   a control optical pattern,
   third optical sensing means for scanning said control pattern coincidentally with the scanning of said second pattern along a third path identical with said first and second paths, said control pattern containing at least one optical indication at least one point along said third path for effecting an interruption in said comparison, and
   means responsive to said third optical sensing means for interrupting said comparison upon sensing of an interrupt indication by said third sensing means.

3. The apparatus of claim 2 wherein said second pattern is scanned coincidentally with said first pattern.

4. The apparatus of claim 2 wherein said control pattern contains a plurality of said optical indications.

5. The apparatus of claim 2, wherein said at least one indication is characterized by a light transmission distinct from that of the remainder of said control pattern, and said third optical sensing means senses such a distinction.

6. The apparatus of claim 2, wherein said three scan paths are in a translational direction.

7. The apparatus of claim 5, further comprising a light source for applying light to said control optical pattern.

8. The apparatus of claim 7, wherein said control pattern is formed at the surface of a control pattern member and said surface transmits light by reflecting the applied light, the at least one indication having a reflectivity different from that of the remainder of the pattern.

9. The apparatus of claim 7 wherein said control pattern is formed in a control pattern member which is disposed between the light source and the third optical sensing means, the portion of the control pattern member containing the at least one indication having a transmittance to the light different from that of the remainder of the member.

10. The apparatus of claim 5 wherein said first and second patterns each contains areas of differing light transmission.

11. The apparatus of claim 7, further including a light source for applying light to said first and second patterns.

12. The apparatus of claim 8, further including a light source for applying light to said first and second patterns, said first and second patterns being formed at the surface of at least one substrate, and each of said first and second patterns containing areas of differing reflectivity to applied light.

13. The apparatus of claim 9, further including a light source for applying light to said first and second patterns, which patterns are formed in at least one substrate disposed respectively between said light source and said first and second optical sensing means, each of the patterns determining areas in said at least one substrate of differing transmittance to the applied light.

14. The apparatus of claim 13 wherein said first and second patterns are formed in one substrate.

15. The apparatus of claim 2, further including:
means for supporting said first, second and third sensing means in fixed relation to each other,
means for supporting said first, second and control patterns in fixed relation to each other, and
means for providing relative translational motion between said sensing means support and said pattern supporting means to thereby produce said first, second and third scan paths.

16. The apparatus of claim 15 wherein said sensing means support is stationary and said pattern supporting means is moved.

17. The apparatus of claim 16 wherein said three patterns are supported on a movable X-Y table member and including means for moving said X-Y table member.

18. The apparatus of claim 2 wherein said means for comparing the sensed data include means for generating signals indicating a failure to compare and said interrupting means inhibit the generation of such failure to compare signals upon the sensing of an interrupt indication.

19. The apparatus of claim 1 further including
fourth optical sensing means for scanning said control pattern;
means for periodically interrupting said third sensing means and for activating said fourth sensing means during said interruption of said third sensing means;
said control pattern further including optically discernible data scanned by said fourth optical sensing means, and;
means responsive to the fourth sensing means for altering the position of said third sensing means with respect to the control pattern and the corresponding positions of said first and second sensing means with respect to said first and second patterns based upon the data sensed by said fourth sensing means.

20. The apparatus of claim 2 further including
fourth optical sensing means for scanning the control pattern along a fourth path
means for periodically interrupting said third sensing means and for activating said fourth sensing means during said interruption of said third sensing means,
said control pattern further including optically discernible data along said fourth path, and
means responsive to the fourth sensing means for altering the position of said third sensing means with respect to the control pattern and the corresponding positions of said first and second sensing means with respect to said first and second patterns based upon the data sensed by said fourth sensing means.

21. A method of comparing preselected portions of a first optically discernible pattern with corresponding portions of a second optically discernible pattern comprising
coincidentally sensing said first and second patterns along corresponding scan paths,
comparing the data sensed from said first pattern with the data sensed from said second pattern,
sensing an optically discernible control pattern coincidentally with said first and second patterns, said control pattern containing at least one optically discernible indication for initiating an interruption in said comparison, and
interrupting said comparison when said indication is sensed.

22. The method of claim 21 wherein said three optically discernible patterns are each provided by the step of applying light to a surface having areas of differing reflectivity to the applied light.

23. The method of claim 21 wherein said three optically discernible patterns are each provided by the step of: applying light through a member having areas of differing transmittance to the applied light.

24. The method of claim 21 including the step of providing identical scan paths for sensing said first, second and control patterns, and positioning said at least one indication along the scan path of said control pattern.

25. The method of claim 21 including the step of providing a plurality of optical indications in said control.

* * * * *